US010822120B2

(12) United States Patent
Linde et al.

(10) Patent No.: US 10,822,120 B2
(45) Date of Patent: Nov. 3, 2020

(54) METHOD AND SYSTEM FOR CONNECTING TWO AIRCRAFT COMPONENTS FROM A THERMOPLASTIC COMPOSITE MATERIAL

(71) Applicant: Airbus Operations GmbH, Hamburg (DE)

(72) Inventors: Peter Linde, Hamburg (DE); Norbert Heltsch, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 153 days.

(21) Appl. No.: 16/113,697

(22) Filed: Aug. 27, 2018

(65) Prior Publication Data

US 2019/0061977 A1    Feb. 28, 2019

(30) Foreign Application Priority Data

Aug. 29, 2017   (DE) .................. 10 2017 119 856

(51) Int. Cl.
*B64F 5/10*       (2017.01)
*B29C 65/00*    (2006.01)
(Continued)

(52) U.S. Cl.
CPC ............... *B64F 5/10* (2017.01); *B29C 65/18* (2013.01); *B29C 65/562* (2013.01);
(Continued)

(58) Field of Classification Search
CPC .. B21J 15/147; B21J 15/142; B21J 15/00–02; B29C 65/60; B29C 65/601;
(Continued)

(56) References Cited

U.S. PATENT DOCUMENTS

| 4,761,871 A | 8/1988 | O'Connor et al. |
| 2002/0125297 A1 | 9/2002 | Stol et al. |

(Continued)

FOREIGN PATENT DOCUMENTS

| DE | 10 2004 038 084 A1 | 3/2006 |
| DE | 10 2011 120 670 A1 | 7/2012 |

(Continued)

OTHER PUBLICATIONS

German Search Report for German Application No. 10 2017 119 856.3 dated Apr. 19, 2018.

(Continued)

*Primary Examiner* — Matthew P Travers
(74) *Attorney, Agent, or Firm* — Jenkins, Wilson, Taylor & Hunt, P.A.

(57) ABSTRACT

A method for connecting two aircraft components composed of thermoplastic composite material by a rivet. The two aircraft components are arranged, in sections, areally on one another, before bores in the two aircraft components are expanded by a mandrel element such that the bores, after the expansion, form one continuous bore for receiving the rivet. Here, the two aircraft components are locally warmed by the mandrel element such that, during the expansion of the bores, the components are thermoplastically deformed. The mandrel element is inserted through the first bore into the second bore. The rivet is introduced into the continuous bore. A system for carrying out the method is also disclosed.

7 Claims, 3 Drawing Sheets

(51) Int. Cl.
   *B29C 65/18*     (2006.01)
   *B29C 65/56*     (2006.01)
   *B29C 65/60*     (2006.01)
   *B29L 31/30*     (2006.01)
   *B21J 15/14*     (2006.01)
   *F16B 5/04*      (2006.01)
   *B21J 15/08*     (2006.01)

(52) U.S. Cl.
   CPC ........ *B29C 65/601* (2013.01); *B29C 66/0222* (2013.01); *B29C 66/0242* (2013.01); *B29C 66/0246* (2013.01); *B29C 66/1122* (2013.01); *B29C 66/326* (2013.01); *B29C 66/43* (2013.01); *B29C 66/721* (2013.01); *B29C 66/73921* (2013.01); *B21J 15/08* (2013.01); *B21J 15/142* (2013.01); *B21J 15/147* (2013.01); *B29C 66/02242* (2013.01); *B29C 66/71* (2013.01); *B29C 66/72141* (2013.01); *B29C 66/73115* (2013.01); *B29C 2793/0045* (2013.01); *B29L 2031/3076* (2013.01); *B29L 2031/3082* (2013.01); *F16B 5/04* (2013.01)

(58) Field of Classification Search
   CPC ............ B29C 65/602; B29C 66/73921; B29C 66/022; B29C 66/0222; B29C 66/0224; B29C 66/02242; B29C 66/0246; B29C 65/18; B29C 66/304; B29C 66/1122; B29C 66/43; B29C 66/721; B29C 66/326; B29C 66/3262; B29C 65/562; B29C 66/0242; F16B 5/04; B64F 5/10; B23P 2700/01
   See application file for complete search history.

(56) References Cited

U.S. PATENT DOCUMENTS

2016/0318631 A1    11/2016    Jörn et al.
2017/0015049 A1    1/2017     Kittel

FOREIGN PATENT DOCUMENTS

| DE | 102011056981 A1 * | 6/2013 | ......... B29C 33/0033 |
| DE | 10 2015 106 563 A1 | 11/2016 | |
| DE | 10 2015 210 965 A1 | 12/2016 | |
| JP | 57157716 A * | 9/1982 | ........... B29C 66/137 |
| WO | WO 2015/135824 A1 | 9/2015 | |

OTHER PUBLICATIONS

European Search Report for Application No. 18190988.8 dated Jan. 15, 2019.
Chinese Office Action for Application No. 201810989225.2 dated Jul. 15, 2020.

* cited by examiner

METHOD AND SYSTEM FOR CONNECTING TWO AIRCRAFT COMPONENTS FROM A THERMOPLASTIC COMPOSITE MATERIAL

CROSS-REFERENCE TO RELATED APPLICATION

This application claims priority to German Patent Application No. 10 2017 119 856.3 filed Aug. 29, 2017, the entire disclosure of which is incorporated by reference herein.

TECHNICAL FIELD

The disclosure herein relates to a method for connecting two aircraft components composed of a thermoplastic composite material by a rivet, and to a system for carrying out a corresponding method.

BACKGROUND

In the development of future aircraft models, the use of novel materials, such as for example thermoplastic composite materials, will be considered. Thermoplastic composite materials are distinguished inter alia by a low weight having a high load capacity. Furthermore, aircraft components composed of thermoplastic composite materials, and in particular composed of thermoplastic fiber composite materials, can also be connected by welded connections, which reduces the production effort in relation to classic rivet connections. It is nevertheless not possible, and also not desired, to dispense entirely with the proven rivet connections. Here, the rivet connections may be used on their own or else together with welded connections. The latter has the advantage in particular that the rivets stop the propagation of cracks in the welded connection. Furthermore, rivet connections have the advantage over welded connections that the state thereof can be visually checked from the outside during maintenance, that is to say no complex technical inspections are necessary.

DE 10 2004 0380 084 A1 discloses a method for connecting two areal structures composed of fiber-reinforced or textile-reinforced thermoplastics by a rivet composed of a fiber-reinforced thermoplastic. For this purpose, the two areal structures are arranged areally on one another and, using a warmed mandrel tool, a hole is formed into a warmed joining zone of the areal structures. Here, the hole is formed in the areal structures by the mandrel tool alone. The rivet is immediately inserted, in a direct elongation of the mandrel tool, into the hole. Because of the temperature of the joining zone and of the mandrel tool, the rivet plasticizes and connects to the areal structures, such that the form fit that is typical of rivets is also supplemented by cohesion. Furthermore, the two ends of the rivet are plastically deformed to form closing heads.

SUMMARY

Proceeding from the prior art, it is an object of the disclosure herein to provide an improved method and an improved system for connecting areal structures composed of or comprising thermoplastic composite materials, which allow for the particular demands of the aviation sector and difficulties in the processing of thermoplastic composite materials.

An object on which the disclosure herein is based is achieved by the method and system disclosed herein.

According to a first aspect of the disclosure herein, a method for connecting two aircraft components composed of or comprising a thermoplastic composite material by a rivet is provided. The method comprises the following steps: providing a first aircraft component composed of a thermoplastic composite material and a second aircraft component composed of or comprising a thermoplastic composite material, arranging the first aircraft component and the second aircraft component relative to one another such that the first aircraft component lies, at least in sections, areally on the second aircraft component, expanding a first bore in the first aircraft component and a second bore in the second aircraft component by a mandrel element, such that the first bore and the second bore, after the expansion, form one continuous bore through the first and the second component for receiving the rivet, wherein the first component and the second component are, during the expansion, locally warmed such that the first component is thermoplastically deformed during the expansion of the first bore and the second component is thermoplastically deformed during the expansion of the second bore, wherein the mandrel element is inserted through the first bore into the second bore, and introducing the rivet into the continuous bore, such that the rivet extends through the first bore in the first aircraft component and the second bore in the second aircraft component.

In other words, according to the disclosure herein, two aircraft components are connected by a rivet. The rivet is preferably manufactured from titanium or some other metal that is approved in the aviation sector. According to the disclosure herein, both aircraft parts are formed from a thermoplastic composite material, which is preferably a fiber composite material. In the present case, a thermoplastic material is to be understood to mean a material which is solid at normal ambient temperatures and which, above a certain temperature, can be plastically deformed. The material-dependent temperature above which thermoplastic material can be plastically deformed adequately for the present implementation is the melting temperature. Preferably, thermoplastic material is warmed to a processing temperature above the melting temperature. A deformation of a thermoplastic material that has been warmed to a temperature above its melting temperature will hereinafter be referred to as thermoplastic deformation. If thermoplastic material cools to a temperature below the melting temperature again, thermoplastic material solidifies again, and can no longer be plastically deformed. For example, as thermoplastic composite material, use may be made of polyether ether ketone (PEEK) which is reinforced with endless fibers composed of carbon. The melting temperature of such a composite material is for example 380° C., and the processing temperature is 400° C. The two components may for example be two shells of an aircraft fuselage, which are connected along a longitudinal seam, or a fuselage segment and a crossmember which is to be connected to the fuselage segment.

The two aircraft components are firstly arranged on one another such that they lie, at least in certain regions, areally on one another. For example, the aircraft components may be arranged with a lap joint. It is also conceivable for at least one of the two aircraft components to partially have the form of a profile beam, such as for example a floor crossmember for a passenger level of a passenger aircraft. The method according to the disclosure herein may also be used for connecting a stringer coupling to two stringers, which are to be connected, at a fuselage transverse joint.

After the two aircraft components, also referred to for short as components, have been arranged on one another, a first bore in the first aircraft component and a second bore in the second aircraft component are expanded by a mandrel element. Here, before the expansion, the first and the second bore have an internal diameter smaller than the external diameter of the rivet that is to be inserted into the bores. For this purpose, the mandrel element, and preferably also the two aircraft components in a limited region around the first and the second bore, are warmed. The mandrel element is then inserted, through an opening in a free surface of the first component, firstly into the first bore of the first aircraft component, and is pushed through the latter. Because of the dimension of the mandrel element, this expands the first bore to a wider diameter than the original diameter of the bore. The temperature of the mandrel element is in this case selected such that the deformation of the first component takes place thermoplastically, wherein, in the context of the disclosure herein, it is also conceivable for the first aircraft component to be warmed in the region of the first bore by additional heating elements, in order that it is reliably above its melting temperature when the first bore is expanded by the mandrel element and, in the process, is thermoplastically deformed. The mandrel element is pushed further through the second bore until it emerges from the second component again through an opening in a free surface of the second component. The bore in the second aircraft component is also expanded by the mandrel element and, in the process, is thermoplastically deformed. The first and the second bore are thus expanded by the mandrel element to form one continuous bore which extends through the first and the second aircraft component and which has a continuous, uniform internal diameter, which is large enough that the continuous bore can receive the rivet.

Finally, the rivet is inserted into the continuous bore and is closed for example in a conventional manner. The rivet thus extends through the first bore in the first aircraft component and through the second bore in the second aircraft component.

The method according to the disclosure herein has the advantage that the two aircraft components already have bores with a first diameter, which are then expanded and made uniform by the mandrel element. The first diameter is smaller than the external diameter of the rivet that is to be inserted into the bores. Therefore, it is possible for larger bores to be formed into the aircraft components in a shorter time than was possible in the prior art. Furthermore, because of the bores already formed, the fraction of composite material to be displaced by the mandrel element is considerably smaller, and therefore the likelihood of the fibers of the composite material not being overstretched during the expansion of the bore, but rather merely being displaced laterally or parallel with respect to the bore by the mandrel element, is higher. Therefore, the disclosure herein makes it possible to produce a more robust connection between the two aircraft components.

In a preferred embodiment, the first bore is formed into the first aircraft component before the first and the second aircraft component are arranged such that the first aircraft component and the second aircraft component lie, at least in sections, areally on one another. This is particularly preferable if the first bore is formed into the first aircraft component by a mechanical drilling tool. It is furthermore preferable if the second bore is formed into the second aircraft component before the first and the second aircraft component are arranged such that the first aircraft component and the second aircraft component lie, at least in sections, areally on one another. This is particularly preferable if the second bore is formed into the second aircraft component by a mechanical drilling tool.

In the preferred embodiment, the first and/or the second aircraft component are already equipped with a bore before the first aircraft component is arranged on the second aircraft component. This may in particular be performed at a different location, such that dirt that forms during the formation of the bore, such as for example drilling chips, can be removed and is not deposited on other sections of the aircraft component. The latter is advantageous in particular if it is the intention for preassembled aircraft components, in which for example electrical components have already been preinstalled, to be connected by rivets. If, in such a case, the bores are formed into the aircraft components only after these have been arranged on one another, then the already installed aircraft components must be protected in a cumbersome manner in order to prevent contamination of the aircraft components. It is however possible according to the disclosure herein for the bores to already have been installed into the aircraft components before further components are installed.

It is also particularly advantageous here that, as a result of the expansion of the bores with the mandrel element, deviations in the relative positioning of the first and of the second bore with respect to one another are compensated by the mandrel tool. Thus, it is for example possible for a multiplicity of bores to be formed into the first and the second component before the two components are arranged on one another. The position of the two components relative to one another is then firstly fixed by a single rivet which is inserted into a first and a second bore which are arranged in alignment with one another. Deviations in the positioning of the further first and second bores because of manufacturing tolerances are then compensated in a particularly advantageous manner if the bores are expanded by the mandrel element. The bores are accordingly not necessarily expanded uniformly in all directions.

In an alternative preferred embodiment, the bore is formed into the first and/or second aircraft component by a laser, that is to say the material of the corresponding aircraft component is evaporated and is not mechanically removed. This has the advantage that, during the evaporation of the material of the aircraft components, no drilling dust that contaminates the aircraft components is generated. With the use of a laser, it is thus possible for the bores to be formed in at least one of the two aircraft components even if dirt-sensitive components have already been installed on the aircraft component.

It is furthermore preferable if, by the mandrel element, a depression which surrounds the first bore in sections is formed, for the purposes of receiving a rivet head of the rivet, into a free surface of the first aircraft component by virtue of the first aircraft component being thermoplastically deformed, wherein the mandrel element is introduced into the first bore proceeding from the free surface. The depression for receiving the rivet head is particularly preferably conical. By virtue of a depression or countersink being formed into the free surface of the first aircraft component, that is to say the surface that points away from the surface with which the first aircraft component bears against the second aircraft component, the surface is already equipped with a receptacle for the head of the rivet in a particularly advantageous manner in one working step, such that the introduced rivet preferably terminates flush with the first surface. This reduces the working effort and furthermore reduces the formation of dust in relation to a method in which the countersink is formed into the first component mechanically, that is to say by conventional chip-removing or subtractive means.

It is furthermore preferable if, after the expansion of the first and of the second bore by the mandrel element, a shoulder element is used in order, on a free surface of the second aircraft component at which the mandrel element emerges from the second bore after the mandrel element has been guided through the first and the second bore, to thermoplastically deform thermoplastic material displaced by the mandrel element, in such a way that an abutment surface for a closing head of the rivet is formed. The abutment surface is preferably planar and extends perpendicular to the direction of extent of the first and of the second bore. In the preferred embodiment, the material displaced by the mandrel element during the expansion of the bores is particularly advantageously thermoplastically deformed in order to form an abutment surface for the closing head of the rivet, by which closing head the rivet is closed on the side situated opposite the head of the rivet. The shoulder element is preferably first used after the bores have been expanded, in order that the excess material of the first and of the second aircraft component can escape unhindered during the expansion of the bores, and is not damaged after the plastic deformation.

It is particularly preferred if the first aircraft component and the second aircraft component are welded to one another before the first bore and the second bore are expanded by the mandrel element and after the first and the second aircraft component are arranged such that the first aircraft component and the second aircraft component lie, at least in sections, areally on one another. By the combination of welded connection and rivet connection, a particularly robust connection can be realized, which is furthermore, because of the connection by the rivets, less sensitive to the formation of cracks. Furthermore, this has the advantage that existing cracks are prevented from propagating in an effective manner by the force-fitting connection of the rivet.

In a second aspect, the object is achieved by a system for carrying out a method according to one of the preceding embodiments. The system comprises an upper clamping element, a lower clamping element and the mandrel element. The system is designed to warm the mandrel element. The upper clamping element has an abutment surface for abutment against the free surface of the first aircraft component, and the lower clamping element has an abutment surface for abutment against the free surface of the second aircraft component. The upper clamping element furthermore has a guide in which the mandrel element is guided when the first and the second bore are expanded by the mandrel element. The advantages of the system correspond to the advantages of the method that is carried out by the system.

In a preferred embodiment, the upper clamping element comprises heating elements by which the first aircraft component can be warmed. It is furthermore preferable if the lower clamping element comprises heating elements by which the second aircraft component can be warmed. In this way, it can be ensured that the aircraft components have, in the region of the bores, been warmed to temperatures above their respective melting temperature when they are expanded by the mandrel element. Particularly gentle expansion of the bores is thus made possible.

It is furthermore preferable if, along a longitudinal axis, the mandrel element has a first section, a second section and a third section. The mandrel element forms, in the first section, a cone tip which is designed for expanding the first and the second bore. The second section adjoins the first section. The mandrel element is of cylindrical form in the second section. The third section adjoins the second section. The mandrel element forms, in the third section, a truncated cone, wherein a diameter of the truncated cone formed by the mandrel element increases along the longitudinal axis away from the second section, and the third section is designed to form the depression for receiving the rivet head of the rivet. This system has the advantage that not only can the bores be expanded, but also a countersink or depression for receiving the rivet head of the rivet can be directly formed, by the mandrel element.

It is finally preferable if the lower clamping element has a shoulder element in order, on the free surface of the second aircraft component at which the mandrel element emerges from the second bore, to thermoplastically deform thermoplastic material displaced by the mandrel element, in such a way that an abutment surface for the closing head of the rivet is formed. This has the advantage that, from the excess material, an abutment surface for the closing head can be formed, and thus an areal load transition between the rivet head and the second aircraft component is ensured.

BRIEF DESCRIPTION OF THE DRAWINGS

The disclosure herein will be described in more detail below on the basis of the drawings, which show an embodiment of the method according to the disclosure herein in which, using an exemplary embodiment of a system according to the disclosure herein, two aircraft components composed of or comprising a thermoplastic composite material are connected by a rivet, wherein.

DETAILED DESCRIPTION

In the following figure description, identical elements will be denoted by the same reference designations in the figures.

Figure 1A:
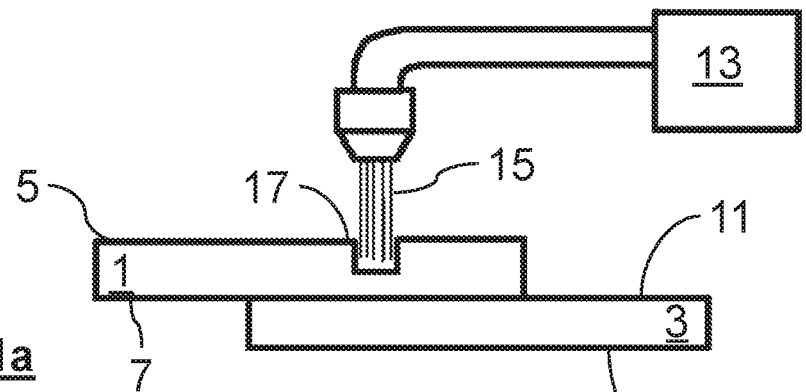
FIG. 1a shows a first step of an exemplary embodiment of a method according to the disclosure herein.

FIG. 1a illustrates a first and a second aircraft component 1, 3. The aircraft components 1, 3 are arranged with a lap joint, such that the first aircraft component 1 lies, in sections, areally on the second aircraft component 3. The first aircraft component 1 has a free surface 5, which is situated opposite a surface 7 by which the first aircraft component 1 lies, in sections, on the second aircraft component 3. Correspondingly, the second aircraft component 3 also has a free surface 9, which is situated opposite a surface 11 by which the second aircraft component 3 lies on the first aircraft component 1. The first and the second aircraft component 1, 3 consequently lie on one another by their respective surfaces 7, 11 situated opposite the free surfaces 5, 9.

The first and the second aircraft component 1, 3 are formed from a thermoplastic fiber composite material. This may for example be a PEEK material reinforced with endless carbon fibers, in the case of which the melting temperature is for example 380° C., and the processing temperature is 400° C.

In the exemplary embodiment in FIG. 1a, there is also illustrated a laser source 13 which emits a laser beam 15 by which a first bore 17 is formed into the first aircraft component 1 and a second bore 19 is formed into the second aircraft component 3. The use, illustrated in FIG. 1a, of a laser for forming the bores 17, 19 into the two components 1, 3 has the advantage that no drilling dust, which could contaminate components already connected to one of the two aircraft components 1, 3, is generated. In FIG. 1a, only the first bore 17 is partially illustrated, to the extent that it has already been formed into the first aircraft component 1. The second bore 19 in the second aircraft component 3 is not illustrated in FIG. 1a.

Figure 1B:
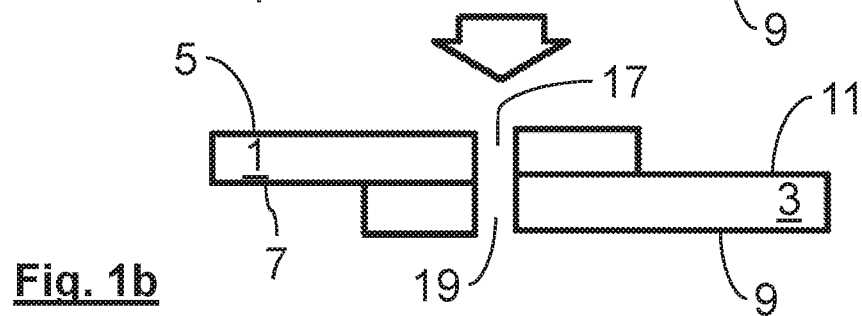
FIG. 1b shows the completed first step of an exemplary embodiment of a method according to the disclosure herein.

FIG. 1b shows the two aircraft components 1, 3 into which the first bore 17 and the second bore 19 have now been fully formed by the laser. In FIG. 1b, the first and the second bore 17, 19 are illustrated in alignment, that is to say the two bores are arranged along an axis and have the same dimensions perpendicular to the axis. This is however not a prerequisite for the implementation of the exemplary embodiment of the disclosure herein. On the contrary, the exemplary embodiment can be used to particular advantage if the first and the second bore 17, 19 have been formed into the two aircraft components 1, 3 before the two aircraft components 1, 3 have been arranged on one another. Because, in this case, in particular if the two components 1, 3 have multiple first and second bores 17, 19, the first and the second bore 17, 19 often cannot be oriented in alignment with respect to one another because of manufacturing tolerances, the exemplary embodiment of a method according to the disclosure herein can be used to advantageously compensate the manufacturing tolerances.

Figure 2:
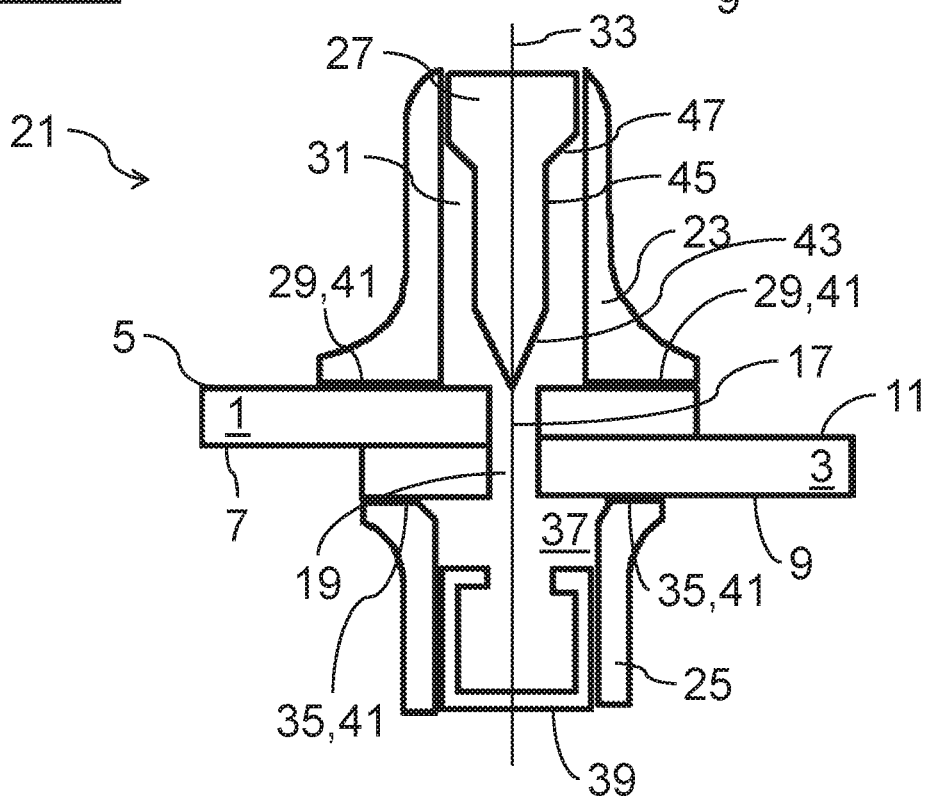
FIG. 2 shows a second step of the exemplary embodiment of a method according to the disclosure herein, and a first sectional view of an exemplary embodiment of a system according to the disclosure herein.

In a subsequent step, a system 21 according to the disclosure herein is firstly arranged on the two aircraft components 1, 3. The system 21, which is illustrated in a sectional view in FIG. 2 and in all of the other figures, comprises an upper clamping element 23 and a lower clamping element 25 and a mandrel element 27. The upper clamping element 23 comprises an abutment surface 29, which lies on the free surface 5 of the first aircraft component 1. The upper clamping element 23 furthermore comprises a guide 31, in this case in the form of a cylindrical bore 31, in which the mandrel element 27 is guided. In the exemplary embodiment illustrated in the figures, the upper clamping element 23 is of rotationally symmetrical construction about a longitudinal axis 33 of the mandrel element 27.

The lower clamping element 25 lies, by an abutment surface 35, on the free surface 9 of the second aircraft component 3. In a bore 37 of the lower clamping element 25, there is arranged a shoulder element 39, the function of which will be discussed in more detail further below with reference to FIG. 4. The bore 37 and the remaining part of the second element 25 are likewise of rotationally symmetrical construction about the longitudinal axis 33 of the mandrel element 27.

In the upper and in the lower clamping element 23, 25, there are furthermore arranged heating elements 41, which are integrated into the abutment surfaces 29, 35. By these heating elements 41, in the working step illustrated in FIG. 2, those regions of the two aircraft components 1, 3 which surround the first and the second bore 17, 19 are warmed to a temperature that lies above their respective melting temperature.

The mandrel element 27 has three sections: a first section 43, a second section 45 and a third section 47. In the first section 43, the mandrel element 27 is conical, as can be seen from the substantially triangular cross section which is shown in the sectional view of the mandrel element in FIGS. 2 through 4. The conical first section 43 of the mandrel element 27 is provided for expanding the first and second bores 17, 19. The second section 45 directly adjoins the first section 43. In the second section 45, the mandrel element 27 has a cylindrical shape. Therefore, the cross section of the mandrel element 27 in the second section 45 corresponds to a rectangle. The second section 45 of the mandrel element 27 is provided for forming a region of a continuous bore through the two aircraft components 1, 3, which region has a uniform diameter and in which region a shank of the rivet is received. The second section 45 of the mandrel element 27 transitions directly into the third section 47. The latter has the shape of a truncated cone, which is reflected in the substantially trapezoidal cross section. The function of the third section 47 of the mandrel element 27 will be discussed in more detail below with reference to FIG. 3.

Not illustrated in the figures is a heating device by which the mandrel element 27 can be warmed to a temperature by which a plastic deformation of the aircraft components 1, 3 is ensured. The heating device may for example be arranged in the mandrel element 27 itself. It is however also conceivable for the mandrel element 27 to be warmed indirectly by a heating device which is arranged in the upper clamping element 23.

Figure 3:
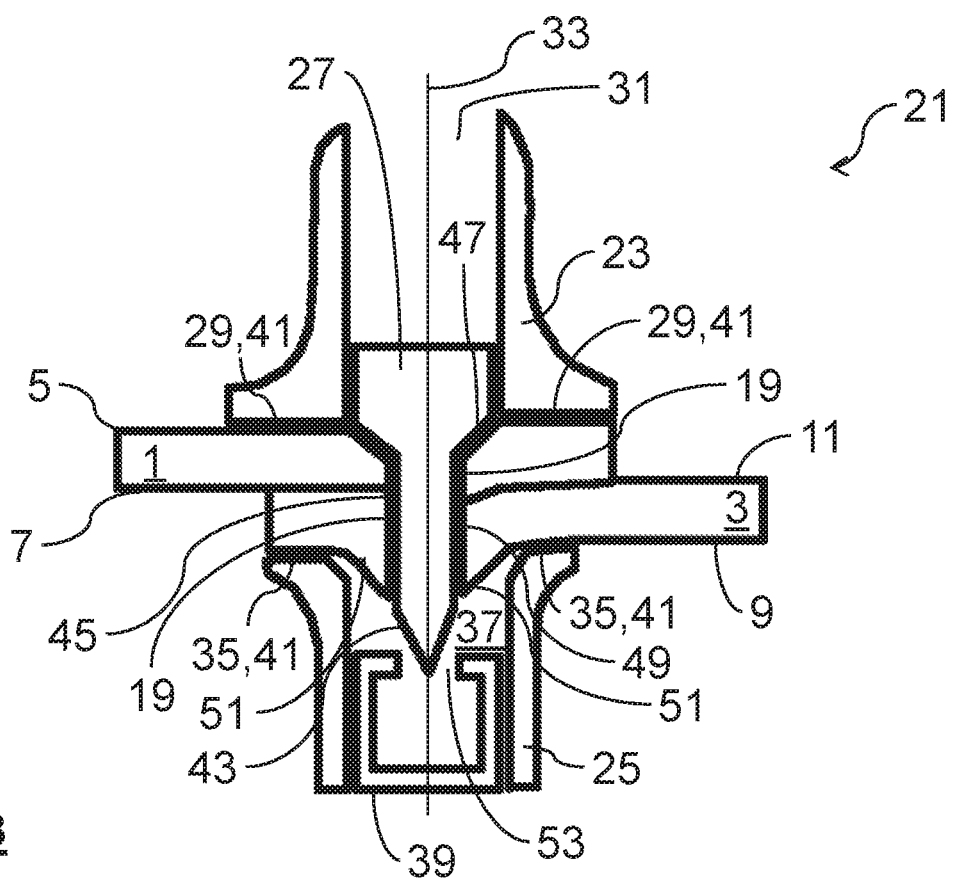
FIG. 3 shows a third step of the exemplary embodiment of a method according to the disclosure herein, and a second sectional view of the exemplary embodiment of a system according to the disclosure herein.

FIG. 3 shows the result of the subsequent method step, in which the mandrel element 27 has been displaced, in the direction of its longitudinal axis 33, through the bores 17, 19 towards the lower clamping element 25. Since the diameter of the mandrel element 27 in the second region 45 is greater than the diameter of the first and second bores 17, 19, the bores 17, 19 have, as a result of the contact with the conical first section 43 of the mandrel element 27, been expanded to form one uniform bore 49, the internal diameter of which corresponds to the external diameter of the mandrel element 27 in the second section 45. Since the aircraft components 1, 3 have, prior to the insertion of the mandrel element 27, been warmed, in the region around the bores 17, 19, to a temperature which lies above their respective melting temperature, the two aircraft components 1, 3 have been thermoplastically deformed during the expansion. This has the advantage that the fibers of the fiber composite material do not tear during the expansion, but are rather merely displaced by the mandrel element 27. In the exemplary embodiment shown in FIG. 3, this can be seen in particular from the excess material 51 which, on the free surface 9 of the second component 3, forms a bead around the continuous bore 49.

As can already be seen in FIG. 3, the shoulder element 39 has a central opening 53 in which the mandrel element 27 can be received when it has been pushed through the aircraft components 1, 3.

Figure 5:
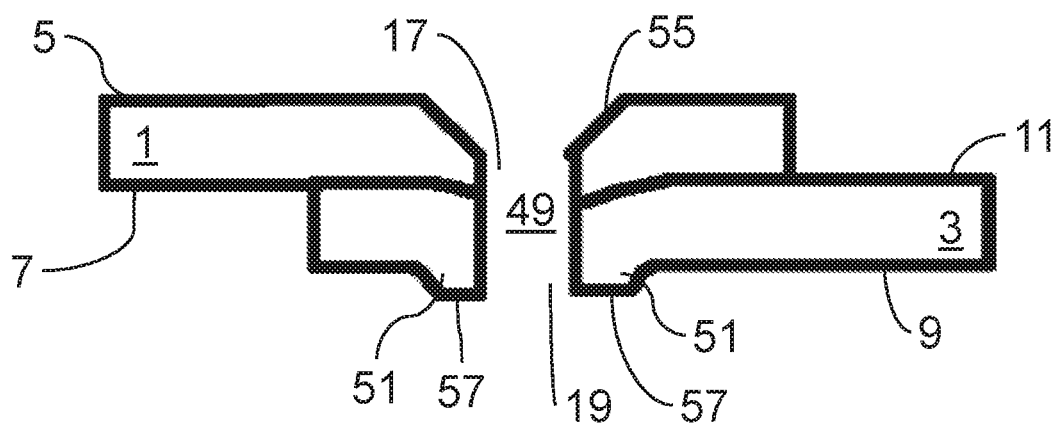
FIG. 5 shows a fifth step of the exemplary embodiment of a method according to the disclosure herein.
Figure 6:
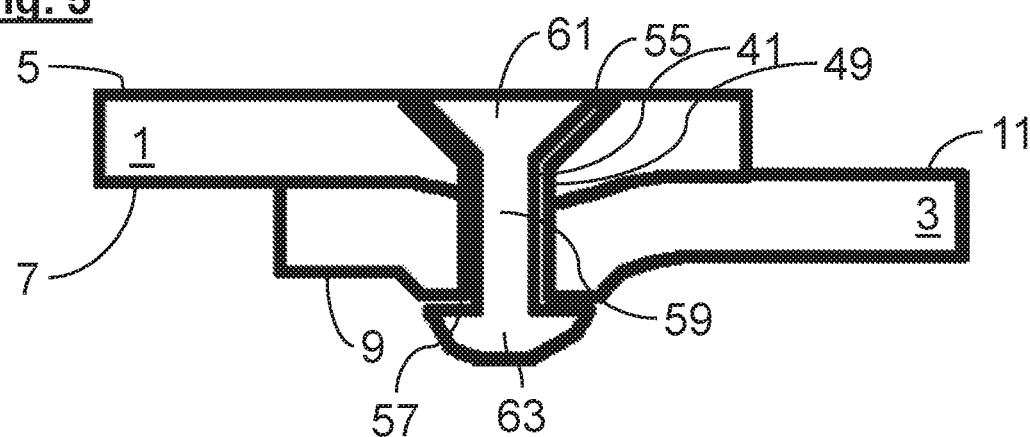
FIG. 6 shows a sixth step of the exemplary embodiment of a method according to the disclosure herein.

It can be clearly seen in FIG. 3 how the third section 47 of the mandrel element 27 has, during the insertion into the first aircraft component 1, formed a depression or countersink 55 which is provided for receiving a closing head of a rivet, as is illustrated in yet more detail with reference to FIGS. 5 and 6. Because of the shape of the third section 47 of the mandrel element 27, the countersink 55 has the shape of a truncated cone.

Figure 4:
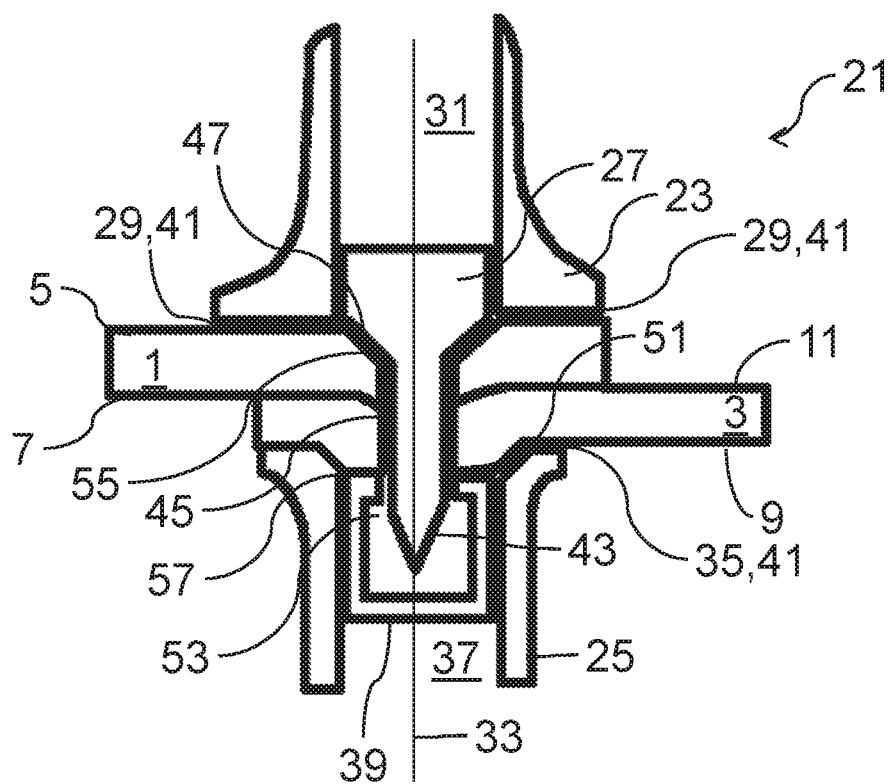
FIG. 4 shows a fourth step of the exemplary embodiment of a method according to the disclosure herein, and a third sectional view of the exemplary embodiment of a system according to the disclosure herein.

In the subsequent method step, the result of which is illustrated in FIG. 4, the shoulder element 39 has been moved along the longitudinal axis 33 of the mandrel element 27 in the bore 37 of the second clamping element 25 towards the free surface 9 of the second aircraft component 3. Here, it has come into contact with the excess material 51 and has formed an abutment surface 57 for a closing head of a rivet. The abutment surface 57 is preferably planar, and extends in a plane which runs perpendicular to the longitudinal axis 33 of the mandrel element 27. The longitudinal axis 33 of the mandrel element 27 coincides with the direction of extent 33 of the first and of the second bore 17, 19. As can be clearly seen in FIG. 4, the entirety of that part of the mandrel element 27 which projects out of the second aircraft component 3 has been received in the shoulder element 39.

FIG. 5 shows the two aircraft components 1, 3 after the system 21 according to the disclosure herein has been removed again. As can be clearly seen in particular in comparison with FIG. 1b, the first and the second bore 17, 19 have been expanded to form one uniform, continuous bore 49. In addition to the continuous bore 49, a depression 55 has also been formed into the first aircraft component 1 by the mandrel element 27, which depression is provided for receiving a rivet head. Since the depression 55 has advantageously also been formed by thermoplastic deformation of the two aircraft components 1, 3, it was possible for the depression 55 to be formed into the aircraft element 1 without drilling dust or other dirt.

It can likewise be clearly seen in FIG. 5 how a planar abutment surface 57 for a closing head of a rivet has been formed, by the shoulder element 39, from the excess material 51 that has been displaced by the mandrel element 27 during the expansion of the bores 17, 19. The abutment surface 57 has also advantageously been formed by thermoplastic deformation of the excess material 51, such that abrasion and associated dust formation, as a result of which the aircraft components 1, 3 or components connected thereto are contaminated, do not occur during the formation of the abutment surface 57 either.

FIG. 6 finally shows a rivet 59 composed of titanium or a titanium alloy which has been inserted into the continuous bore 41. The rivet 59 comprises a rivet head 61 and a closing head 63, which are formed in a known manner. As can be directly seen in FIG. 6, the rivet head 61 is entirely received in the depression 55, such that the rivet head 61 terminates flush with the free surface 5 of the first aircraft component 1. Since the depression 55 is designed for receiving the rivet head 61, it is furthermore the case that a particularly uniform transmission of force between rivet 59 and first aircraft component 1 is ensured. Correspondingly, it can also be seen in FIG. 6 that the closing head 63 lies areally on the abutment surface 57 provided therefor. In this case, too, because of the specially formed shape, provision is advantageously made for a uniform transmission of force between rivet 59 and second aircraft component 3.

Figure 7:
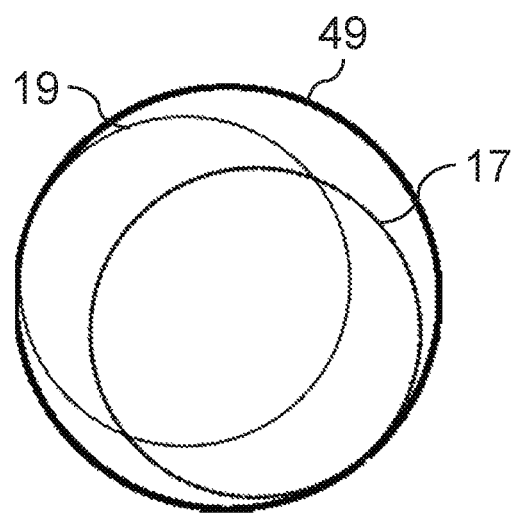
FIG. 7 shows a schematic example of how manufacturing tolerances can be compensated by the method according to the disclosure herein.

Finally, it is schematically illustrated in FIG. 7 how, by the method according to the disclosure herein or using a system 21 according to the disclosure herein, manufacturing tolerances can be compensated if the first and the second bore 17, 19 are formed into the respective aircraft components 1, 3 before the aircraft components 1, 3 are arranged on one another. FIG. 7 illustrates the first and the second bore 17, 19 in plan view, wherein only the outer circumference of the respective bore 17, 19 is indicated. Since the two bores 17, 19 are not arranged in alignment, it is not possible for a rivet to be inserted therein. According to the disclosure herein, provision is now made for the first bore 17 and the second bore 19 to be formed with a diameter smaller than the outer diameter of the rivet 59. The two bores 17, 19 are expanded to the final diameter of the continuous bore 49, by the mandrel element 27, only after the two aircraft components 1, 3 have been arranged on one another. Since, because of thermoplastic deformation, the bores do not need to be uniformly expanded in all directions, it is possible, during the introduction of the mandrel element, for manufacturing tolerances to be compensated, and for one uniform bore 49 to be provided for receiving the rivet 59. Here, it is advantageously the case that no drilling dust is generated during the expansion, and associated contamination is avoided. Furthermore, it is also the case that no fibers in the fiber composite material are destroyed, which increases the strength of the aircraft components 1, 3 and of the connection thereof.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for connecting two aircraft components comprising a thermoplastic composite material by a rivet, the method comprising:
    providing a first aircraft component comprising a thermoplastic composite material and a second aircraft component comprising a thermoplastic composite material;
    arranging the first aircraft component and the second aircraft component relative to one another such that the first aircraft component lies, at least in sections, areally on the second aircraft component;
    expanding a previously formed first bore in the first aircraft component and a previously formed second bore in the second aircraft component by a mandrel element, such that the first bore and the second bore, after expansion, form one continuous bore through the first and the second aircraft component for receiving the rivet, wherein the first aircraft component and the second aircraft component are, during the expansion, locally warmed such that the first aircraft component is thermoplastically deformed during the expansion of the first bore and the second aircraft component is thermoplastically deformed during the expansion of the second bore, wherein the mandrel element is inserted through the first bore into the second bore; and
    introducing the rivet into the continuous bore, such that the rivet extends through the first bore in the first aircraft component and the second bore in the second aircraft component.

2. The method according to claim 1, wherein the first bore is formed into the first aircraft component before the first and the second aircraft component are arranged such that the first aircraft component and the second aircraft component lie, at least in sections, areally on one another,
    wherein the first bore is formed into the first aircraft component by a chip-removing drilling tool.

3. The method according to claim 1, wherein the second bore is formed into the second aircraft component before the first and the second aircraft component are arranged such that the first aircraft component and the second aircraft component lie, at least in sections, areally on one another,
    wherein the second bore is formed into the second aircraft component by a chip-removing drilling tool.

4. The method according to claim 1, wherein the first bore is formed into the first aircraft component by a laser, and/or
    wherein the second bore is formed into the second aircraft component by a laser.

5. The method according to claim 1, wherein, by the mandrel element, a depression which surrounds the first bore in sections is formed, for purposes of receiving a rivet head of the rivet, into a free surface of the first aircraft component by the first aircraft component being thermoplastically deformed, wherein the mandrel element is introduced into the first bore proceeding from the free surface,
    wherein the depression for receiving the rivet head is conical.

6. The method according to claim 1, wherein, after the expansion of the first and of the second bore by the mandrel element, a shoulder element is used in order, on a free surface of the second aircraft component at which the mandrel element emerges from the second bore after the mandrel element has been guided through the first and the second bore, to thermoplastically deform thermoplastic material displaced by the mandrel element, such that an abutment surface for a closing head of the rivet is formed,
    wherein the abutment surface is planar and extends perpendicular to a direction of extent of the first and of the second bore.

7. The method according to claim 1, wherein the first aircraft component and the second aircraft component are welded to one another before the first bore and the second bore are expanded by the mandrel element and after the first and the second aircraft component are arranged such that the first aircraft component and the second aircraft component lie, at least in sections, areally on one another.

\* \* \* \* \*